Sept. 15, 1970   A. D. SMITH   3,528,640
VALVE HAVING AN INDICATOR FOR A DESIRED THROTTLED
POSITION OF THE VALVE
Filed May 15, 1968

INVENTOR
ANTHONY D. SMITH

BY *Charles R. Fay*

ATTORNEY

United States Patent Office 3,528,640
Patented Sept. 15, 1970

3,528,640
VALVE HAVING AN INDICATOR FOR A DESIRED THROTTLED POSITION OF THE VALVE
Anthony D. Smith, Westboro, Mass., assignor to Smith Valve Corporation, Worcester, Mass., a corporation of Massachusetts
Filed May 15, 1968, Ser. No. 729,156
Int. Cl. F16k 51/00, 5/06
U.S. Cl. 251—285                              8 Claims

ABSTRACT OF THE DISCLOSURE

A valve having a stem, a handle for moving the stem, and a stop plate in the form of a disc underlying the handle and being independently rotatable with respect to said handle and said stem, and means for tightening the handle to the stop plate so that the handle and stop plate thereafter move together.

BACKGROUND OF THE INVENTION

With respect to certain systems employing throttling valves, and particularly in air conditioning and heating systems, it is necessary to set certain valves in the installation at throttle positions, i.e., neither fully open nor closed, but in selected positions between full and open, for optimum operation of the system. When for any reason these valves have to be shut down, it is then necessary to once more determine the optimum throttling position of the individual valves.

SUMMARY OF THE INVENTION

This invention provides a valve having a stop plate in the form of a disc which is rotatably associated with respect to the valve stem and underlies the handle, being free thereof and movable independently. When the installer has found his correct throttling position, he then moves the disc to a predetermined position, and tightens the handle with respect to the stop plate so that thereafter the stop plate moves with the handle. Thus when the handle is moved for instance to a closed position of the valve, the stop plate indicates the respective degree of motion of the handle from closed position to the predetermined desired optimum throttling position.

DESCRIPTION OF THE PREFERRED EMBODIMENT

Figure 1:
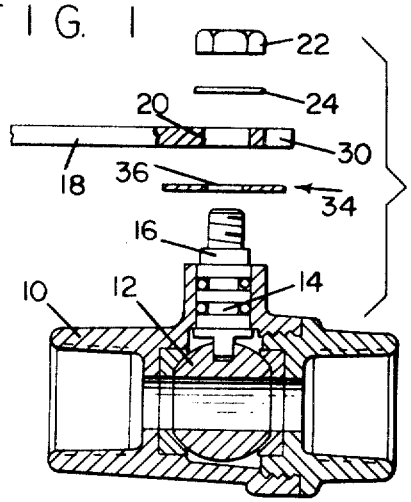
FIG. 1 is an exploded view illustrating the invention with the valve and valve actuator shown in section.

The present invention is applicable to most valves but has been illustrated as applied to a quarter-turn ball valve having a conventional valve body 10 and conventional valve ball 12 with a stem 14 for turning the same. The stem extends through the usual stem seals to the exterior of the valve body and is flat-sided as is clearly indicated at 16 for the reception of a handle 18 having a corresponding generally rectangular opening therein as at 20 so that when the handle is assembled with respect to the stem, the stem can be turned thereby. The stem is threaded and receives a nut 22 and if desired a lock washer 24 between the nut and the handle.

Figure 2:
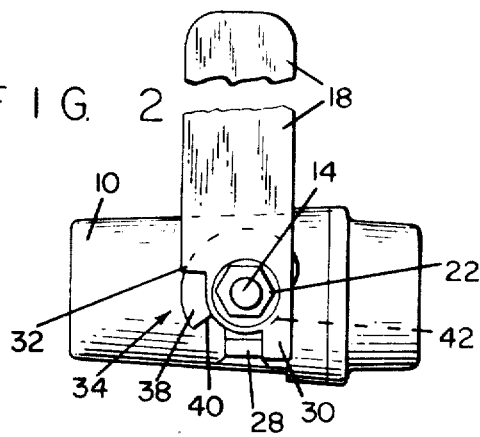
FIG. 2 is a top plan view of the valve of FIG. 1 showing the valve handle in closed position.
Figure 4:
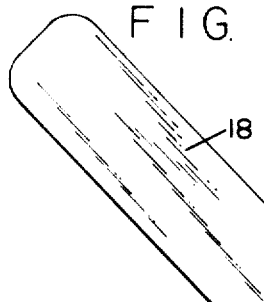
FIG. 4 is a diagrammatic view illustrating a desired throttling position with the stop plate in a predetermined position, having been moved against the valve stop.

In this illustration, the valve body 10 is provided with the usual stop 28, the handle having projections 30 and 32 which limit the handle to a quarter turn. In FIG. 2 the valve is shown as fully closed and as well known to those skilled in the art should the handle be turned in a counterclockwise direction until the shoulder at 32 engages stop 28, the valve would be fully open. FIG. 4 illustrates a part way position of the handle, stem and valve, showing the throttling position selected as an illustration of the present invention.

A stop plate which is generally indicated at 34 is provided with a circular central opening 36. This plate is rotatably mounted with respect to the stem and the diameter of the opening 36 is great enough so that the stop plate can rotate on the stem about the flat-sided portion thereof closely adjacent to the valve body. In other words, the stem does not affect the stop plate in any way except to maintain it on an axis.

Figure 3:
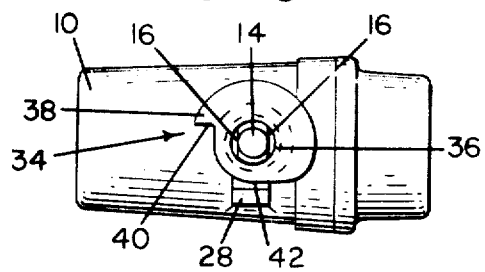
FIG. 3 is a top plan view showing the handle removed and illustrating the stop plate.
Figure 5:
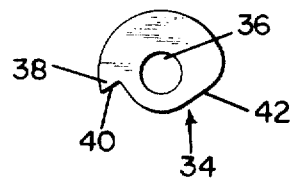
FIG. 5 shows the stop plate per se.

The stop plate is provided with a radially extending spur 38 which forms a radial shoulder 40, and the stop plate also preferably embodies another stop surface at 42 preventing excess rotation in a closewise direction, FIG. 3, by contact with stop 28, while rotation of the stop plate 34 in an anticlockwise direction in FIGS. 2, 3 and 4 for instance, will cause shoulder 42 to abut the stop 28.

The stop plate 34 is preferably smooth on both sides and easily rotatable with respect to handle 18 at any time when the nut 22 is relatively loose. On the other hand however when the nut 22 is tightened on stem 14, it causes the handle 18 to impinge with some force on the disc 34 and then the disc moves with the handle in either direction as limited by the stop 28.

In one manner of use of the device it is merely necessary to adjust the valve handle to the desired throttle position, see FIG. 4, regardless of the position of the stop plate. Then the nut 22 may be loosened, if not already loose enough, and the operator, while maintaining the selected handle position, rotates the stop plate 34 counterclockwise to contact the valve stop 28. The nut 22 is once again tightened. Thereafter, the stop plate 34 moves with the handle, and if the handle should be turned to the "off" position of FIG. 2, the spur 38 and the shoulder 40 will be in the position shown in FIG. 2, indicating the predetermined optimum degree of throttling of handle 18, even though the latter is in valve closed position.

Another manner of use of the device is also possible. The handle is placed in the closed position, and then making sure that the stop disc 34 is in the FIG. 4 position, with shoulder 40 against stop 28, the nut 22 is tightened. Then when the handle is moved counterclockwise to throttling position, the edge 40 remains where it is against the stop 28, and the stop plate does not move. The handle having moved from the FIG. 2 to the FIG. 4 position, the same indicating situation obtains as previously described. In this case, the handle slips relative to the stop disc in moving from the FIG. 2 to the FIG. 4 position, but upon being returned to FIG. 2 position, the frictions between the handle and the stop plate is sufficient to move the stop plate also.

I claim:

1. A valve comprising a body having a flow passage therethrough, an actuatable valve element in the body to close and open the flow passage, a valve stem on the element for actuating it, a handle for the valve stem to turn the same and the valve element,
   a stop on the valve body, means on the handle in position to abut the stop when the valve is closed,
   an indicator associated with the stem and the handle to indicate a selected valve element setting,
   means on the indicator to abut the stop at a selected open setting of the valve, said indicator being movable independently of the handle to change the adjustment of the setting, and means to tighten the handle relative to the indicator to an extent to then cause the indicator to move with the handle.

2. The valve of claim 1 wherein the indicator underlies the handle.

3. The valve of claim 1 wherein the indicator is mounted on the stem.

4. The valve of claim 1 wherein the indicator is mounted on the stem under the handle.

5. The valve of claim 1 wherein the indicator is mounted on the stem under the handle and the tightening means is located on the stem over the handle.

6. The valve of claim 1 wherein said indicator comprises a disc having an aperture, the stem extending through the aperture into the handle.

7. The valve of claim 1 wherein said indicator comprises a disc having an aperture, the stem extending through the aperture into the handle, the means on the indicator comprising a radial spur on the disc.

8. The valve of claim 1 wherein said indicator comprises a disc having an aperture, the stem extending through the aperture into the handle, the means on the indicator comprising a radial spur on the disc, said valve being of the type requiring only a quarter turn of the handle between fully open and closed positions of the valve, the stem and handle including interengaging means for simultaneous motion, the disc being freely rotatable relative to the stem.

References Cited

UNITED STATES PATENTS

| | | | |
|---|---|---|---|
| 280,176 | 6/1883 | Higgins | 251—288 |
| 1,104,918 | 7/1914 | Mouat | 251—285 |
| 1,558,992 | 10/1925 | Lombardi | 251—285 |
| 2,282,488 | 5/1942 | MacClatchie | 251—288 XR |
| 2,761,647 | 9/1956 | Zeck | 251—285 XR |

FOREIGN PATENTS

| | | |
|---|---|---|
| 19,570 | 9/1914 | Great Britain. |
| 67,022 | 2/1940 | Poland. |

HENRY T. KLINKSIEK, Primary Examiner

U.S. Cl. X.R.

137—556.3